United States Patent [19]

Kimura et al.

[11] 3,980,616

[45] Sept. 14, 1976

[54] FLAMEPROOFING AGENT FOR POLYAMIDE RESINS

[75] Inventors: Tsuneo Kimura; Katsuhisa Koyama, both of Kita-Kyushu, Japan

[73] Assignee: Mitsubishi Chemical Industries Ltd., Tokyo, Japan

[22] Filed: Nov. 12, 1974

[21] Appl. No.: 523,043

[30] Foreign Application Priority Data

Nov. 12, 1973 Japan............... 48-127085
Jan. 14, 1974 Japan................ 49-7241
Oct. 1, 1974 Japan............... 49-112986

[52] U.S. Cl................ 260/45.8 NT; 260/45.9 NC; 260/78 S; 260/78 SC
[51] Int. Cl.²............... C08K 5/20; C08K 5/34
[58] Field of Search............ 260/32.6 NA, 45.8 NT, 260/78 S, 78 SC, 45.9 NC

[56] References Cited
UNITED STATES PATENTS

| | | | |
|---|---|---|---|
| 3,624,252 | 11/1971 | Labarge | 260/248 |
| 3,627,737 | 12/1971 | Smith | 260/78 |
| 3,660,344 | 5/1972 | Michael et al. | 260/37 |
| 3,793,289 | 2/1974 | Koch et al. | 260/45.8 |
| 3,843,650 | 10/1974 | Pews et al. | 260/248 |
| 3,888,822 | 6/1975 | Gilleo | 260/45.8 |

*Primary Examiner*—Lewis T. Jacobs
*Assistant Examiner*—R. A. White
*Attorney, Agent, or Firm*—Oblon, Fisher, Spivak, McClelland & Maier

[57] ABSTRACT

Flame resistance is imparted to polyamide resins by the process which comprises melting said polyamide at a temperature between the softening point of the polyamide and 250°C, and adding a flameproofing quantity of a flameproofing agent to said melt, and thereafter solidifying said melt whereby said polyamide is flameproofed to an extent of UL-94, said flame proofing agent being selected from the group consisting of

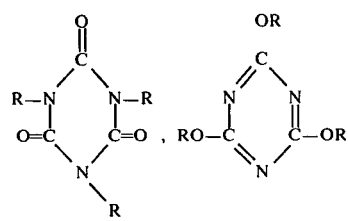

wherein R is the same or different and represents hydrogen or lower alkyl, formamide and mixtures thereof.

9 Claims, No Drawings

FLAMEPROOFING AGENT FOR POLYAMIDE RESINS

BACKGROUND OF THE INVENTION

1. Field of the Invention

The present invention relates to a flameproofing agent for polyamide resins and more particularly to a flameproofing agent that causes no deterioration in the mechanical properties of the polyamide to which it is added.

2. Description of the Prior Art

Flameproofing has been found to be necessary for a variety of resins used for electrical parts, instruments, and interior materials. However, while these materials are effectively flameproofed, their overall safety is not satisfactory as a result of a decrease in mechanical strength. For flameproofing polyamides, certain halogen-containing compounds or mixtures of the halogen-containing compounds with antimony compounds or other Group V metal compounds have been found effective. Although the flameproofing effects on the polyamides by these compounds are relatively high, in order to impart sufficient flameproofing effect, a large amount, such as 20–40 wt%, of the flameproofing agent is required. As a result, the resulting polyamide articles have inferior mechanical properties, especially low impact strength. Moreover, those flameproofing agents are toxic or generate toxic gases when decomposed. Accordingly, the flameproofing agents are not considered safe and the polyamide articles containing large amounts of the flameproofing agent can cause extensive pollution.

SUMMARY OF THE INVENTION

Accordingly, it is one object of the present invention to provide a flameproofing agent for polyamide resins which imparts a flameproof effect to polyamide resins without causing a deterioration in mechanical properties.

These and other objects have been attained by this invention. According to this invention, flame resistance is imparted to polyamide resins by the process which comprises melting said polyamide at a temperature between the softening point of the polyamide and 250°C, and adding a flameproofing quantity of a flameproofing agent to said melt, and thereafter solidifying said melt whereby said polyamide is flameproofed to an extent of UL-94, said flame proofing agent being selected from the group consisting of

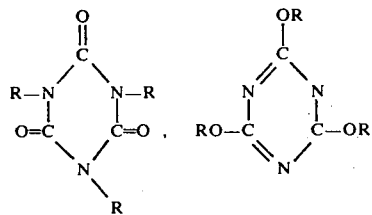

wherein R is the same or different and represents hydrogen or lower alkyl, formamide and mixtures thereof.

DETAILED DESCRIPTION OF THE PREFERRED EMBODIMENTS

The cyanuric acid compounds used as the flameproofing agent of the invention can be the compounds of formula (I) such as isocyanuric acid, trismethylisocyanurate, tris-ethyl isocyanurate, tris(n-propyl)isocyanurate, N,N'-diethyl isocyanurate, methyl isocyanurate, etc. and/or those compounds of formula (II) such as cyanuric acid, trimethyl cyanurate, triethyl cyanurate, tri(n-propyl)cyanurate, methyl cyanurate, diethyl cyanurate, etc.

It is especially preferable to use cyanuric acid and isocyanuric acid, which are tautomers because of their outstanding flameproof effects and because of their commercial availability. The compounds of formula (I) have high flameproofing properties, but the compounds wherein R is hydrogen have the greatest flameproofing effects. Cyanuric acid which has been prepared by thermal decomposition of urea is generally used, but compounds having lower decomposing temperatures may also be used. When the cyanuric acid compound contains impurities having a lower decomposition temperature such as cyanic acid, biuret, ammelide, ammeline, etc., and is admixed with the polyamide resin, the impurities are decomposed to form foam (bubbles) during molding of the polyamide resin. These bubbles can cause a deterioration in the mechanical properties of the molded articles, especially the impact strength.

Accordingly, highly pure cyanuric acid compounds are preferably used. These cyanuric acid compounds are purified by a recrystallization etc.

Since the cyanuric acid compounds are the most important in terms of flameproofing, they will be mainly discussed here. However, it should be understood that what is said here about cyanuric acid is intended to be general to the other agents as well.

Various polyamide resins can be flameproofed by the agents of this invention. However, in order to prevent the decomposition of the cyanuric acid compounds of molding temperature, it is usual to use a polyamide resin which has a softening point which is lower than 250°C, and especially lower than 240°C. Suitable polyamide resins are Nylon 6, Nylon 6–12, Nylon 12, Nylon 6/6.6 copolymer, etc. The flameproofing agents of this invention are especially effective when the flameproofing agent is incorporated with Nylon 6 or Nylon 6/6.6 copolymer. The polyamide resin can also be blended with other resins. However, the composite resin should have a softening point of lower than 250°C. Accordingly, Nylon 6.6 which has a high softening point itself, can only be used with difficulty. As a typical embodiment of the application of the flameproofing agents of this invention, the cyanuric acid compound should be admixed with the polyamide resin after polymerization. It is preferable to add it to chips or pellets of the polyamide resin, which are usually used as the raw material for the molding. When the cyanuric acid compound is admixed before polymerization, the temperature of the polymerization will be higher than the above limitation so that decomposition of the cyanuric acid may occur. A side-reaction can occur to impart inferior physical properties to the resulting polyamide resin.

The flameproofing agent should be added to the polyamide melt at a temperature of less than 250°C and preferably between 215° and 235°C.

The cyanuric acid compound or the amide compound flameproofing agents are usually used in a range of 0.5–20 wt% preferably 1–10 wt%, especially 2–5 wt%. Although the amount of the flameproofing agent is less than 20 wt%, which is lower than the amount required of other flameproofing agents, sufficient flameproof effect can be imparted.

As a result, the deterioration of the physical properties of the polyamide resin itself can be minimized.

When the cyanuric acid compound is in solid form, it is preferable to crush it to form particles having an average particle diameter of less than $200\mu$ and especially less than $100\mu$. When the particle size is too large, the cyanuric acid compound will not be completely miscible in the polyamide resin, so that a deteriorated appearance can result. When the particle size is too fine, aggregates of cyanuric acid compound can readily form yielding white spots in the polyamide resin as well as deteriorate the appearance of the polyamide resin. Accordingly, in order to prevent the coagulation of the cyanuric acid compound, it is preferable to add a lubricant such as a metal salt of higher fatty acids, e.g., calcium stearate; an aliphatic amide, e.g., methylene bis-stearamide, ethylene bis-stearamide; a wax, e.g., paraffin wax, polyethylene wax, etc. The amount of lubricant used should be 0.005–2 wt% to that of the cyanuric acid compound.

Any conventional method can be used for molding the polyamide resin containing the cyanuric acid compound or the amide compound. Typical examples are as follows.

1. The cyanuric acid compound is added to the molten polyamide resin to prepare chips or pellets and the molded article is prepared by molding the chips or pellets.

2. Fine particles of chips or pellets of the polyamide resin and the cyanuric acid compound are mechanically blended by a tumbler and the mixture is molded to prepare the molded article.

3. Fine particles of chips or pellets of the polyamide resin are mixed with cyanuric acid compound, and the mixture is melted and extruded to a strand form or a sheet form and the product is cut by a cutter or pelletizer to form the chips or pellets. The molded article is prepared by molding the chips or pellets.

4. To the preparation of the chips or pellets of (3), excess amounts of the cyanuric acid compound are added which result in master pellets which contain excess of the cyanuric acid compound. The master pellets are mixed with the polyamide resin which contains no cyanuric acid compound, and then the molded article is prepared by molding the mixed pellets.

Methods (3) or (4) are most practical for most industrial purposes. In a typical application of the flameproofing agent of this invention, the polyamide resin containing the cyanuric acid compound is molded at lower than 250°C, and a temperature especially lower than 240°C. From the viewpoint of safety and processability, it is preferable to use a lower temperature for the molding (it is necessary to be higher than the softening point of the resin).

In the step of preparing the chips or pellets containing the cyanuric acid compound as the final raw material, the temperature can be higher than the above limitation. However, an excess amount of the cyanuric acid compound corresponding to the amount that had decomposed must be added in or to the chips or pellets before or after the preparation of the chips or pellets. This is uneconomical and complicates the operation. Accordingly, it is preferable to prepare the pellets or chips at a temperature lower than the limitation. When the molding is carried out at higher than the above limiting temperature, the decomposition of the cyanuric acid compound causes a decrease in the flameproof effect. Further, the gas generated by the decomposition is incorporated within the molded article so as to deteriorate the physical properties especially the impact strength of the molded article. The utility of the molded article therefore is decreased.

The flameproof effect can be maintained by adding excess amounts of the cyanuric acid compound. However, the deterioration of the physical properties of the molded article cannot be recovered. Even though the temperature is within the limiting range, if the residence time is too long in the cylinder during injection molding or extrusion molding, the decomposition of the cyanuric acid compound is easily caused. Accordingly, the residence time is preferably short, at least shorter than 10 minutes, especially shorter than 5 minutes. In the application of the flameproofing agent of this invention, it is necessary to mold under conditions in which the cyanuric acid compound is not decomposed to generate gas in the polyamide resin.

Although the molding operation problems have been illustrated in which cyanuric acid compounds have been used, similar problems can also be found in the case of the amide compound as the flameproofing agent. Formamide is liquid but it can be admixed with polyamide in a manner similar to that of the cyanuric acid compounds. The molding method for preparing the articles can be by extrusion molding, injection molding, compression molding, blow molding, foam molding, etc. so as to prepare blocks, films, sheets, filaments, and other molded articles.

When foam inhibiting agents such as dicarboxylic acids, hydroxylcarboxylic acids or aromatic diols are added together with the flameproofing agent of this invention, the deterioration of the physical properties of the polymer resin can be decreased. Suitable dicarboxylic acids are aliphatic dicarboxylic acids such as glutaric acid, adipic acid, suberic acid, sebacic acid, dodecane dicarboxylic acid, etc. Typical aromatic dicarboxylic acids are phthalic acid, isophthalic acid, terephthalic acid, etc. Suitable hydroxyl dicarboxylic acids are the aliphatic hydroxyl dicarboxylic acids such as lactic acid, tartaric acid, and maleic acid. Typical aromatic hydroxyl carboxylic acids are p-hydroxy benzoic acid, salicylic acid, gallic acid, etc. Suitable aromatic diols are hydroquinone, resorcinol, pyrocatechol, etc.

The ratio of the cyanuric acid compound to these foam inhibiting additives is usually 1 : 00025~1 : 2, preferably 1 : 0.005~1 : 1, especially 1 : 0.01~1 : 0.1, and suitable effective amounts of the additive can be incorporated directly into the polyamide resin. The additives act to prevent the deterioration of physical properties of the polyamide resin containing the cyanuric acid compound. The amount of the additive suitable for preventing the deterioration of physical properties of the polyamide resin is usually 0.005~1 wt%, preferably 0.05~0.2 wt% to the polyamide resin. The flameproofing agent can be used in combination with other flameproofing agents or with foaming agents, antistatic agents, coloring agents, lubricants, stabilizers, nucleating agents or fillers such as glass fiber, talc, asbestos, clay, or whisker.

The polyamide resin molded articles prepared by incorporating the flameproofing agent of this invention can impart remarkable flameproofing effects even though the content of the flameproofing agent is small, as compared to the effects obtained using conventional flameproofing agents. Since the content of the flameproofing agent in the molded article can be small, the following advantages can be expected.

Firstly, the molded articles have excellent flameproof effect. The standard of UL-94 (Standard of Underwriters Laboratories, Inc. of U.S.A.) can easily be obtained.

Secondly, the molded articles have physical properties, especially impact strength, substantially the same as those polyamide resins without the flameproofing agent.

Thirdly, the compounds used as flameproofing agents in this invention do not cause environmental and extensive pollution. The flameproof effect of these compounds are specific being effective only in combination with polyamide resins. The mechanism of the effect is not clear. In the invention, the softening point means the vicat softening point of ASTM D-1525-58T.

Having generally described the invention, a more complete understanding can be obtained by reference to certain specific examples, which are included for purposes of illustration only and are not intended to be limiting unless otherwise specified.

EXAMPLE 1 and REFERENCES 1, 2 and 3

Nylon 6 was admixed with 3 wt% cyanuric acid powder having an average particle diameter of less than 100μ (Shikoku Kasei K.K. I.C.A. powder) and the mixture was injection-molded at 235°C by an injection molding machine (3.5 ounces) to prepare a combustion test piece of 5 × ½ × ⅛ inch (165 mm × 12 mm × 3 mm). The test piece was held in the vertical position by a clamp and a flame having a length of 2 cm was contacted with the lower end of the test piece for 10 seconds pursuant to the Standard of UL-94. The test was repeated for five test pieces. The results are shown in Table 1.

The same combustion tests were carried out for the samples prepared in accordance with the process of Example 1 except admixing no cyanuric acid compound (Reference 1), molding at 255°C (Reference 2) or molding at 260°C (Reference 3). The results are shown in Table 1. Incidentally, the vicat softening point of the Nylon 6 was 215°C.

Table 1

| | cyanuric acid content (wt. %) | injection moulding temperature (°C) | combustion test result 1 | 2 | 3 | 4 | 5 | flameproof effect | strength at first yield point (kg/cm$^2$) | Izod impact strength (kg/cm/cm) |
|---|---|---|---|---|---|---|---|---|---|---|
| Example 1 | 3 | 235 | X ⓐ | X X | X ⓐ | X 1⊗ | X 2⊗ | V-0 | 791 | 3.3 |
| Reference 1 | 0 | 235 | 24▲ | 18▲ | 27▲ | 23▲ | 23▲ | V-2 | 869 | 3.9 |
| Reference 2 | 3 | 255 | X ⓐ | X 2⊗ | X ⓐ | X 1Δ | X X | V-0 | 725 | 2.1 |
| Reference 3 | 3 | 260 | X 3 | ⓐ ⓐ | X 2Δ | X·X 1Δ | ·X ⓐ | V-0 | 690 | 1.7 |

In the Tables, the symbols mean as follows:

| | | Polymer itself | | Molten falling polymer | | |
|---|---|---|---|---|---|---|
| Mark | | uncombustible | combustible | none | uncombustible | combustible |
| 1 | X | ○ | | | ○ | |
| 2 | ⊗ *1 | ○ | | | ○ | |
| 3 | ⓐ | ○ | | | | ○ |
| 4 | Δ *1 | | ○ | | ○ | |
| 5 | ▲ *1 | | ○ | | | ○ |
| 6 | ⓐ | | ○ | | | ○ |

Remark:
*1 The number preceeding the mark ⊗, Δ or ▲ indicates the combustion time (seconds) after withdrawing the flame.
*2 The combustion or lack of combustion of molten falling polymer was determined by firing absorbent cotton disposed at a distance of 30 cm under the test piece.

The upper row of the combustion test shows the combustion test results at first contact of the flame for 10 seconds. The lower row of the combustion test shows the combustion test results at second contact of the flame for 10 seconds after extinction of the flame from the first contact. (The second contact of flame was not given if it was ▲ at the first contact). The flameproof effect was shown by V-0, V-1, and V-2 defined in UL-94.

EXAMPLES 2 and 3 and REFERENCES 4–6

The same combustion tests were carried out for the samples prepared in accordance with the process of Example 1 except changing the type and amount of the flameproofing agent as shown in Table 2. The results are shown in Table 2.

Table 2

| | flameproofing agent | Amount (wt.%) | injection moulding temperature (°C) | combustion test result 1 | 2 | 3 | 4 | 5 | flameproof effect | strength at first yield point (kg/cm$^2$) | Izod impact strength (kg/cm/cm) |
|---|---|---|---|---|---|---|---|---|---|---|---|
| Example 2 | cyanuric acid | 2 | 235 | 1⊗ 3⊗ | X 1⊗ | X 2Δ | X ⓐ | X ⓐ | V-0 | 889 | 3.9 |
| Example 3 | '' | 5 | '' | X X | X X | X 1Δ | X X | X ⓐ | V-0 | 779 | 3.0 |
| Reference 4 | Sb$_2$O$_3$— halogen type compound * | 10 20 | '' | X 3⊗ | X X | X 1⊗ | X X | X 2⊗ | V-0 | 600 | 2.4 |

Table 2-continued

| | flameproofing agent | Amount (wt.%) | injection moulding temperature (°C) | combustion test result | | | | | flame-proof effect | strength at first yield point (kg/cm²) | Izod impact strength (kg/cm/cm) |
|---|---|---|---|---|---|---|---|---|---|---|---|
| | | | | 1 | 2 | 3 | 4 | 5 | | | |
| Reference 5 | halogen type compound * | 20 | " | 27▲ | 28▲ | 26▲ | 29▲ | 23▲ | V-2 | 710 | 3.1 |
| Reference 6 | Sb₂O₃ halogen type compound * | 10 10 | " | 18▲ | 26▲ | 21▲ | 28▲ | 27▲ | V-2 | 720 | 3.3 |

* The halogen type compound was 1,2,3,4,7,8,9,10,13,13,14,14-dodecachloropentacyclo [12,2,1,1$^{7.10}$,0$^{4a.12a}$,0$^{6a.10a}$] octadecadi-2,8-en.

EXAMPLE 5 and REFERENCES 5 and 6

Nylon 6/6.6 copolymer (6/6.6 = 85/15 molar ratio) was admixed with 30 wt% of cyanuric acid; and the mixture was kneaded by an extruder having a diameter of 30 mm to prepare master pellets containing 30 wt% of cyanuric acid. The master pellets were blended with Nylon 6/6.6 copolymer containing no cyanuric acid, diluting it 10 times. The mixture was injection molded at 230°C by a 3.5 ounce injection-molding machine. The combustion test was carried out in accordance with the method of Example 1. The same combustion tests were carried out for the samples prepared in accordance with the process of Example 5 except admixing no cyanuric acid (Reference 5) or injection-molding at 260°C (Reference 6). The results are shown in Table 3. The vicat softening point of the Nylon 6/6.6 copolymer was 200°C.

eter and 3.0 mm length. The pellets were used as master pellets and Nylon 6 pellets containing no cyanuric acid were added to the master pellets to dilute them to a 2% cyanuric acid content. The pellets were injection-molded at 230°C to prepare combustion test pieces (3 mm × 12 mm × 165 mm), and test pieces for physical properties. In the injection-molding, 0.1% of adipic acid was added. The results are shown in Table 4. The softening point of Nylon 6 was 215°C. Similar results were obtained by using tartaric acid or hydroquinone instead of adipic acid.

EXAMPLES 7 and 8

Nylon 6/6.6 (molar ratio of Nylon 6/Nylon 6.6 is 85/15; the softening point is 200°C) or Nylon 12 (softening point of 172°C) was admixed with 3% cyanuric acid by dry-blending, and the mixture was kneaded at 220°C or 200°C by an extruder having a diameter of 30

Table 3

| | Amount of cyanuric acid (wt.%) | injection moulding temperature (°C) | combustion test result | | | | | flame-proof effect | strength at first yield point (kg/cm²) | Izod impact strength (kg cm/cm) |
|---|---|---|---|---|---|---|---|---|---|---|
| | | | 1 | 2 | 3 | 4 | 5 | | | |
| Exp. 5 | 3 | 230 | X ⓐ | X ⓐ | X ⓐ | X ⓐ | X ⓐ | V-0 | 780 | 3.6 |
| Ref. 5 | 0 | 230 | 21▲ | 25▲ | 19▲ | 22▲ | 22▲ | V-2 | 825 | 4.0 |
| Ref. 6 | 3 | 260 | X | X 2Δ | X 3Δ | 1Δ ⓐ | X ⓐ | V-0 | 655 | 1.8 |

EXAMPLE 6

A 70 wt parts of Nylon 6 was admixed with 30 wt parts of cyanuric acid containing 0.1% of calcium stearate which was crushed to an average particle diameter of less than 100μ by dry-blending, and the mixture was kneaded at 230°C by an extruder having a diameter of 30 mm to prepare pellets having a size of 3.0 mm diammm to prepare pellets. The pellets were admixed with 0.1% of adipic acid by dry-blending, and injection-molded at 220°C or 200°C to prepare combustion test pieces and test pieces for physical properties. The results are shown in Table 4. Similar results were obtained by using tartaric acid or hydroquinone instead of adipic acid.

Table 4

| | | Additive | Amount (%) | Combustion test result | | | | | Strength at first yield point (kg/cm²) | Izod impact strength (kg cm/cm) |
|---|---|---|---|---|---|---|---|---|---|---|
| | | | | 1 | 2 | 3 | 4 | 5 | | |
| Example 6 | Nylon 6 | cyanuric acid adipic acid | 2 0.1 | 2⊗ | X | X | X | X | 880 | 4.0 |
| Example 7 | Nylon 6/66 | cyanuric acid adipic acid | 3 0.1 | X | 3Δ | X | X | 2⊗ | 825 | 4.2 |
| Example 8 | Nylon 12 | cyanuric acid adipic acid | 3 0.1 | X | 3Δ | X | 2Δ | 2▲ | 512 | 4.7 |

REFERENCE 7

A 100 wt parts of ε-caprolactam was admixed with 5 wt parts of water and 3 wt parts of cyanuric acid and the mixture was heated at 250°C under a gauge pressure of 6 kg/cm² for 2 hours and then at 250°C under 320 Torr for 2 hours, and at 250°C under 160 Torr for 2 hours, to polymerize it. The relative viscosity (η rel) of the resulting polymer in 98% conc. sulfuric acid was 1.7 (polymer concentration 1g/dl at 25°C). When ε-caprolactam was polymerized by the same manner except without adding cyanuric acid, the relative viscosity (η rel) of the resulting polymer was 6.3 (polymer concentration 1g/dl at 25°C). The combustion test of Example 1 was carried out by using the resulting polyamides.

The results are as follows:

| combustion test result | | | | | flame-proofing effect |
|---|---|---|---|---|---|
| 1 | 2 | 3 | 4 | 5 | |
| ⓐ | ⓐ | ⓐ | ⓐ | ⓐ | V-2 |

EXAMPLE 9

Nylon 6 chips were admixed with 3 wt % of formamide and the mixture was heated at 100°C for 2 hours. The Nylon 6 chips covered with formamide was injection-molded to prepare a test piece having 3 mm × 12 mm × 165 mm. The combustion test was carried out in accordance with the method of Example 1. The same combustion tests were carried out for the samples prepared in accordance with the process of Example 9, except admixing no formamide.

The results are shown in Table 5.

Table 5

| Flame proofing agent | Amount (wt.%) | Injection moulding temperature (°C) | Combustion test result | | | | | flame-proof effect | strength at first yield point (kg/cm²) | Izod impact strength (kg cm/cm) |
|---|---|---|---|---|---|---|---|---|---|---|
| | | | 1 | 2 | 3 | 4 | 5 | | | |
| formamide | 3 | 235 | X ⓐ | X ⓐ | X ⓐ | X ⓐ | X ⓐ | V-0 | 765 | 3.6 |

Japanese Pat. publication No. 9901/1968 discloses stabilizing polyamide with 2,4,6-trihydroxyl-1,3,5-triazine or a copper salt thereof. However, there is no disclosure of imparting flame resistance to the polyamide, as in the present invention, nor is there any disclosure of the flameproofing technique which initially requires that the flameproofing agent be added to the polyamide melt after polymerization of the polyamide.

It is reacted into the resin itself, or it is coated onto the resin, the required degree of flameproofing namely, that sufficient to meet the standards of UL-94, will be impossible to attain.

The UL-94 standard is the flameproofing standard for this industry. The standard was published on Sept. 17, 1973 by the Underwriters Laboratories, Inc. of U.S.A.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A flame resistant polyamide resin having recurring amide groups as integral parts of the main polymer chain prepared by a process, which comprises the steps of:

melting said polyamide at a temperature between the softening point of said polyamide and 250°C; adding a flame proofing quantity of a flameproofing agent to said melt; and thereafter solidfying said melt whereby said polyamide is flameproof to an extent of UL-94, said flameproofing agent being selected from the group consisting of

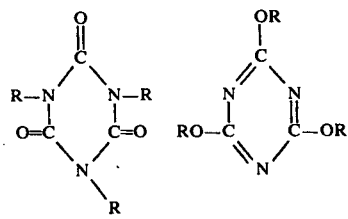

wherein R is the same or different and represents hydrogen or lower alkyl, formamide and mixtures thereof.

2. The flame resistant polyamide of claim 1, wherein said agent is a cyanuric acid compound having the formula:

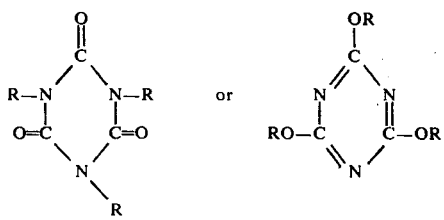

wherein R is the same or different and represents hydrogen or lower alkyl.

3. A flame resistant polyamide resin having recurring amide groups as integral parts of a main polymer chain prepared by a process, which comprises the steps of:

melting said polyamide at a temperature between the softening point of said polyamide and 250°C; adding a flameproofing quantity of a flameproofing agent selected from the group consisting of formamide,

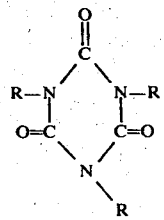

wherein R is the same or different and represents hydrogen or lower alkyl, and

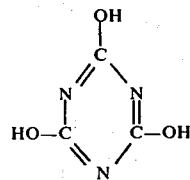

to said melt; and thereafter solidifying said melt whereby said polyamide is flameproof to the extent described in UL-94.

4. The flame resistant polyamide of claim 2, wherein said cyanuric acid compound is selected from the group consisting of tris-methyl isocyanurate, tris-ethyl isocyanurate, tris(n-propyl)isocyanurate, N,N'-diethyl isocyanurate, cyanuric acid, trimethyl cyanurate, triethyl cyanurate, tris(n-propyl)cyanurate, methyl cyanurate and diethyl cyanurate.

5. The flame resistant polyamide of claim 2, wherein said agent is cyanuric acid or isocyanuric acid.

6. The flame resistant polyamide of claim 1, wherein said agent is added at a rate of 0.5–20 wt% of the total polyamide resin.

7. The flame resistant polyamide of claim 1, wherein said agent is cyanuric acid and is added at a rate of 2–5 wt % of total polyamide resin composition.

8. The flame resistant polyamide of claim 1, wherein the polyamide resin and 0.5–20 wt% of the flameproofing agent is admixed at a temperature lower than the decomposition temperature of the flameproofing agent.

9. The flame resistant polyamide of claim 1, wherein said polyamide is melted at a temperature of between 215°–235°C and a flame-proofing quantity of said agent is added thereto.

* * * * *